Feb. 27, 1934.  F. KUHN ET AL  1,949,124
TOASTER
Filed July 8, 1929   2 Sheets-Sheet 1
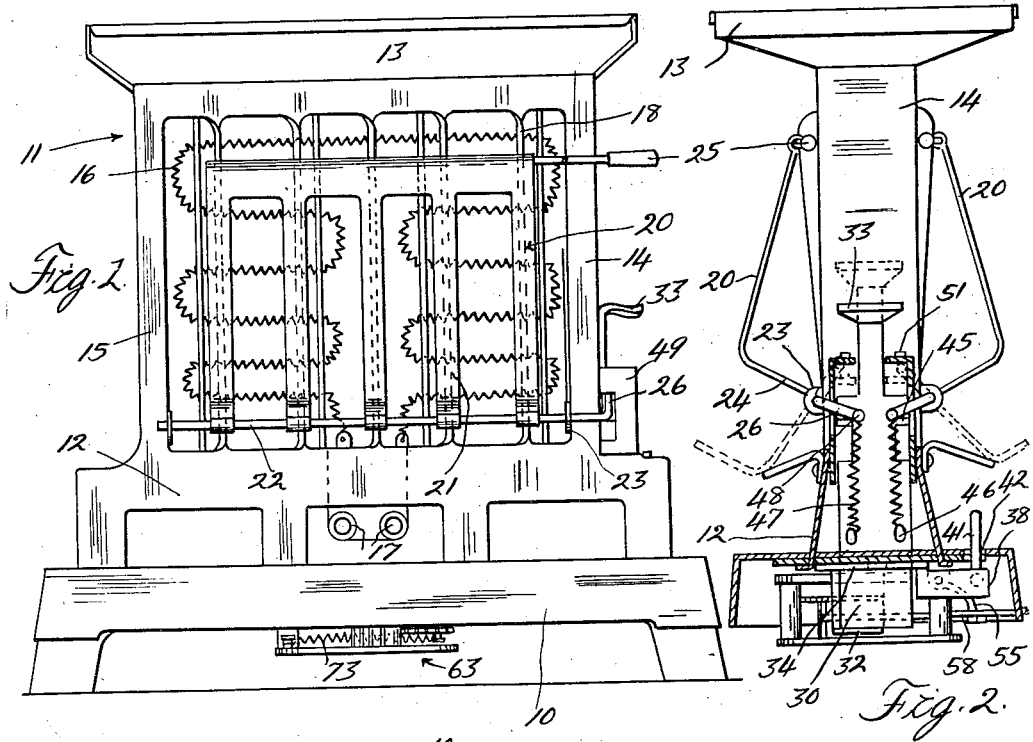
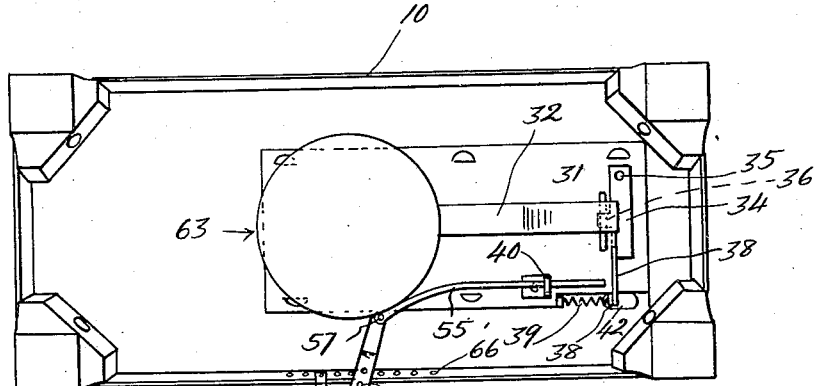
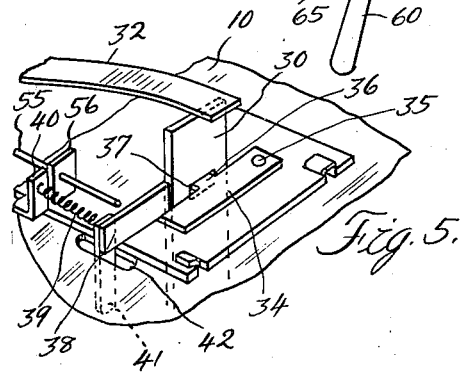
INVENTORS
Frank Kuhn
Laurence H. Thomas
BY
ATTORNEYS Feb. 27, 1934.   F. KUHN ET AL   1,949,124
TOASTER
Filed July 8, 1929   2 Sheets-Sheet 2
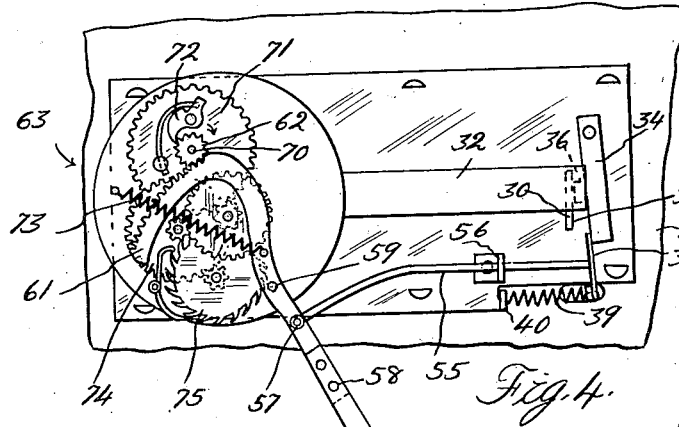
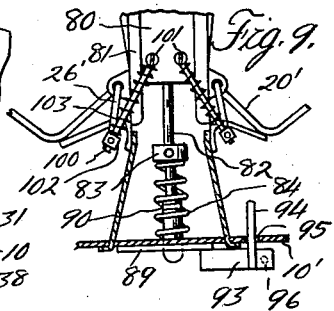
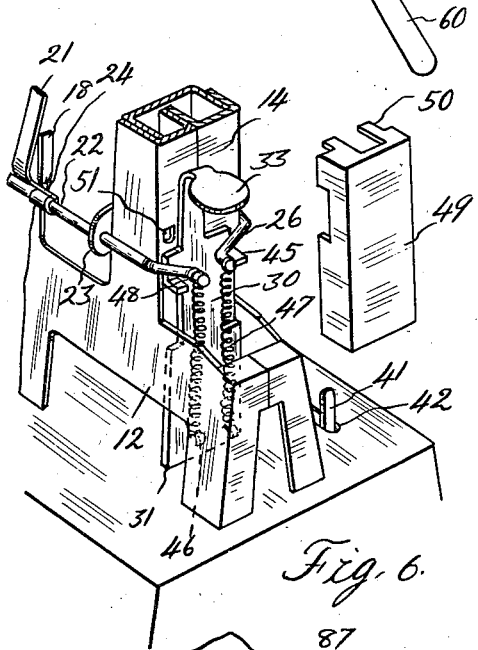
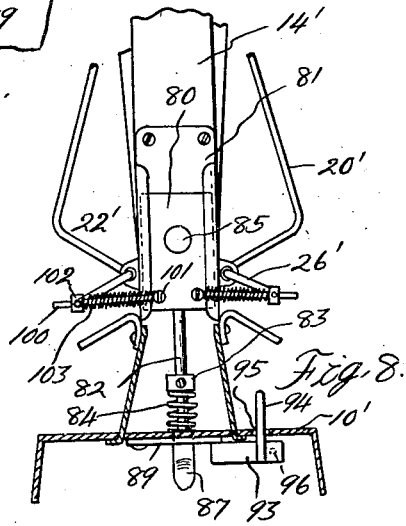
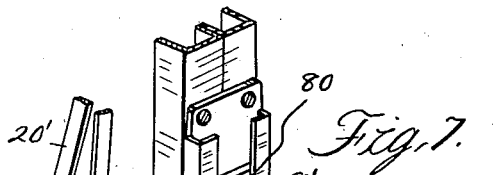
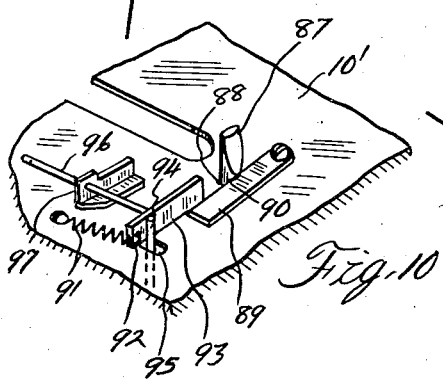
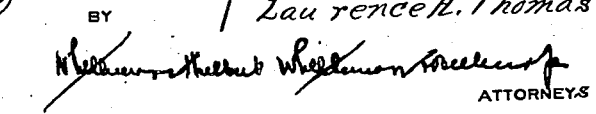
INVENTORS
Frank Kuhn
Laurence H. Thomas
BY
ATTORNEYS Patented Feb. 27, 1934

1,949,124

UNITED STATES PATENT OFFICE 1,949,124

TOASTER

Frank Kuhn and Laurence H. Thomas, Detroit, Mich., assignors to American Electrical Heater Company, Detroit, Mich., a corporation of Michigan Application July 8, 1929. Serial No. 376,689

17 Claims. (Cl. 53—5)

This invention relates to toasters and has particular reference to an electric toaster provided with means for automatically moving the toast away from the heating element when the toasting operation is completed.

One of the primary objects of this invention is to provide a toaster of the above mentioned character, with holders for supporting slices of bread adjacent the heating element, together with means whereby each holder will automatically adjust itself to the thickness of the slice of bread being supported.

A further object of this invention is to provide automatically releasable means for retaining the toast holders in toasting position together with means whereby each toast holder may be moved to non-toasting or inoperative position independent of said retaining means to permit inspection of the slices of bread being toasted during the toasting operation.

Other objects and advantages of the invention will become more apparent as the following description proceeds, particularly when reference is had to the accompanying drawings wherein, Figure 1 is a side elevational view of a toaster constructed in accordance with the teachings of this invention;

Figure 2 is an end elevational view of the toaster shown in Figure 1, showing a portion thereof in section;

Figure 3 is a bottom plan view of the toaster;

Figure 4 is a fragmentary view similar to Figure 3 with a portion of the structure broken away;

Figure 5 is a perspective view of a portion of the operating mechanism;

Figure 6 is a perspective view of a second portion of the operating mechanism;

Figure 7 is a perspective view of a slightly modified form of construction;

Figure 8 is a fragmentary sectional view through a portion of the structure shown in Figure 7 showing the toast holders in toasting position;

Figure 9 is a view similar to Figure 8 showing the toast holders in non-toasting position, and Figure 10 is a fragmentary perspective view of another portion of the operating mechanism of the form of invention shown in Figure 7.

Referring now particularly to the drawings wherein like reference characters designate corresponding parts throughout all views, there is illustrated in Figure 1 an electric toaster including a base 10 and a toaster frame work designated generally by the reference character 11. This frame work includes a lower platform 12, an upper platform 13 and the end walls 14 and 15 respectively. Supported in a vertical position centrally of the frame work is a heating element 16 provided with the terminals 17 for connection to a suitable source of electric current. Arranged on opposite sides of the heating element are the guards 18 which may, as illustrated, be formed integral with the upper and lower platforms, these guards forming supports against which the slices of bread are adapted to rest when in toasting position.

For supporting slices of bread against the guards 18, bread holders 20 are provided and these holders are hingedly supported from the end plates 14 and 15 for movement toward and away from the heating element. In detail each bread holder includes a plurality of fingers 21 fixed at their lower ends to a shaft 22 rotatably mounted in ears 23 projecting laterally from the end plates. The fingers 21 are preferably integrally united adjacent their upper ends and each finger is bent adjacent its lower end to form a base flange 24 on which the edge of the slice of bread, supported by the holder, is adapted to rest. Each holder is further provided with a handle 25 whereby the same may be manually moved toward or away from the heating element and each rod 22 is provided with an angularly bent end forming a lever arm 26 by which the rod may be rotated to also move the holders toward or away from the heating element.

For moving the bread holders toward and away from the heating element there is provided a slide 30 mounted for vertical movement adjacent the end plate 14. This slide projects through a slot 31 in the base and is normally held in its uppermost position as shown in dotted lines in Figure 2 of the drawings, by a spring 32 fixed to the under side of the base 10 and bearing at its end against the lower edge of the slide. A finger piece 33 is formed on the slide 30 whereby the slide may be manually depressed against the tension of the spring 32 to the position shown in full lines in Figure 2 of the drawings.

For holding the slide in its depressed position there is provided a latch member 34 pivoted as at 35 to the under side of the base 10. This latch member is provided with the dog 36 adapted to enter a recess 37 in the slide 30 when the latter is in its depressed position. The latching member is provided with an extension 38 and fixed to this extension is a spring 39 secured at its other end to a lug 40 fixed to the base 10, so that the latching member is constantly urged into latching position. A projection 41 formed on the extension 38 projects through a slot 42 in the base 10 whereby the latching member may be manually withdrawn from engagement with the recess 37 to permit movement of the slide to its uppermost position by the spring 32.

Struck out from the slide 30 are the projections 45 adapted upon movement of the slide to its uppermost position to engage the levers 26 to move the bread holders to their open or inoperative position. The slide is further provided with the struck out lugs 46 to which springs 47 are secured, the opposite end of each spring being secured to one of the lever arms 26 as at 48, these springs being adapted when the slide is in its depressed position, to exert a yieldable force on the lever arms to move the bread holders to toasting position. It will be obvious that when the slide is depressed, the projections 45 will be moved downwardly sufficiently to permit movement of the lever arms 26 to the position shown in full lines in Figure 2 of the drawings.

The operation of the device as thus far described is as follows. With the slide in its elevated position, slices of bread are placed with their lower edges on the base flanges 24 of the holders 20. The slide 30 is then depressed by pressing downwardly on the finger piece 33 and the slide will be latched in its depressed position by engagement of the dog 36 in the recess 37. With the slide held in its depressed position the bread holders will be yieldably held in operative position adjacent the heating element and thereby support the slices of bread in toasting position. By virtue of the yieldable connections between the lever arms 26 and the slide 30, the bread holders will readily adapt themselves to slices of bread of different thicknesses, the springs 47 compensating for variations in the thickness of the slice. Further the springs 47 permit manual movement of the bread holders away from the heating element even when the slide is latched in its depressed position, so that the bread slices may be readily inspected during the toasting operation. The springs 47 and the slide may be enclosed in a suitable housing 49 detachably secured to the end wall 14 by means of tongues 50 formed on the housing for engagement in recesses 51 formed in the said end wall.

The invention further contemplates the provision of means for automatically releasing the latch 34 to effect a movement of the bread holders to non-toasting position a predetermined time after the bread holders have been moved to toasting position, together with means whereby this time interval may be manually adjusted. While any suitable mechanism may be provided for this purpose, the invention contemplates, as a preferred embodiment, the provision of a clockwork mechanism adapted to be set in operation by adjusting a lever or the like and adapted to release the latch when a predetermined time interval has elapsed.

This mechanism is shown in Figures 3 and 4 and includes a rod 55 slidably mounted in a suitable supporting lug 56 fixed to the under side of the base 10. This rod is mounted for longitudinal movement from the position shown in Figure 3 of the drawings, where its free end is spaced from the latch 34, to the position shown in Figure 4 of the drawings where its free end engages the extension 38 of the latch 34 to move the latch about its pivot against the tension of the spring 39 and to thus withdraw the dog 36 from the recess 37. The other end of this rod is pivotally connected as at 57 to a lever 58. This lever is pivotally mounted as at 59 and is provided on its one end with the handle portion 60 and on its other end with a rack segment 61 adapted for engagement with a pinion 62 of a clockwork mechanism designated generally by the reference character 63. The handle portion 60 of the lever projects laterally beyond the base 10 and a lug 65 is adjustably fixed to the side of the base 10 to form a stop for limiting movement of the lever about its pivot. While the lug 65 may be adjustably fixed to the base 10 in any desired manner, it may as illustrated be adapted for engagement in any one of a series of openings 66 formed in the side of the base, these openings being calibrated if desired to indicate the time at which the latch will be released corresponding to any given setting. Thus, the time interval will be varied depending upon the positioning of the stop 65.

The clock-work mechanism includes the pinion 62 fixed to a shaft 70. Rotatably mounted on this shaft is a gear 71 locked for rotation with the pinion 62 by a spring pressed pawl 72 when the pinion 62 is rotated in the direction of the arrow in Figure 4 of the drawings. A spring 73 tends to move the lever 60 in a direction to move the pinion 62 in this direction. Thus, the lever 60 may be manually moved about its pivot against the tension of the spring 73 until it engages the stop 65, after which it may be released and the spring 73 will tend to move the lever back to its original position. The clock-work mechanism retards return of the lever to its original position and includes the train of gearing 74 driven from the gear 71 and driving an escapement mechanism designated generally by the reference character 75.

From the above it is believed that the structure and operation of this form of the invention will be clearly apparent. With the bread holders in open position slices of bread are placed on the same and the lever 60 is then moved about its pivot until it engages the stop 65, which has previously been set to give the desired time interval. The slide 30 is then depressed to move the bread holders to toasting position and the slide will be latched in its depressed position by the latch member 34. With the slide in its depressed position and the latch releasing mechanism in operation, the bread holders may be manually moved outwardly away from the heating element to permit inspection of the bread slices as above brought out. The spring 73 will tend to return the lever 60 to its normal position but this movement of the lever will be retarded by the clockwork mechanism as will be clearly apparent. After a predetermined interval, however, the lever 60 will have returned to its normal position, in which position the free end of the rod 55 will engage the latch member 34 to withdraw the dog 36 from the recess 37. With the latch released by the rod 55, the spring 32 will force the slide 30 upwardly, thus causing the lugs 45 to move the bread holders to open or non-toasting position.

In Figures 7 to 10 inclusive a slightly modified form of construction is shown in which the bread holders 20' provided with the actuating lever arms 26' are adapted to be controlled in their movement by a slide 80. This slide is similar to the slide 30 and is mounted for vertical movement in a guideway 81 fixed to the end plate 14' of the toaster frame work.

The slide 80 is provided with the downwardly extending rod 82 and fixed to this rod is a collar 83 forming an abutment for one end of a spring 84 which is sleeved on the rod and which abuts at its other end the upper face of the base 10' of the toaster. Thus the spring 84 constantly urges the slide 80 to its uppermost position as illustrated in Figure 9 of the drawings. A handle 85 projects laterally from the slide 80 to provide means for manually depressing the slide and a member 87 is fixed to the lower end of the rod 82 and projects through an opening 88 in the base 10' to provide means for latching the slide in its depressed position. In detail the latching mechanism includes a latch member 89 adapted for engagement in a recess 90 formed in the member 88, the latching member being constantly urged to latching position by a spring 91 fixed to the under side of the base 10' and secured as at 92 to an extension 93 of the latch member. A pin 94 fixed to the extension 93 extends through a slot 95 in the base to provide means for manually releasing the latch while a rod 96 mounted for longitudinal movement in a bracket 97 fixed to the under side of the base is adapted for connection to a suitable clock-work mechanism similar to that above described for automatically releasing the latch mechanism.

For moving the toast holders upon movement of the slide 80 there is provided a pair of rods 100. Each rod is pivotally secured as at 101 to the slide 80 and sleeved on each rod 100 is a lug 102 fixed to the end of one of the levers 26'. A spring 103 sleeved on each rod 100 abuts at its one end against the lug 102 and at its other end against the pivot point 101 of its respective rod.

The arrangement is such that when the slide is depressed to move the pivot points 101 below the axes of the rods 22', the springs 103 acting on the lugs 102 urge the bread holders to toasting position as illustrated in Figure 8 of the drawings. When, however, the slide is moved to its uppermost position, by the spring 84, the pivot points 101 are moved above the axes of the rods 22' whereupon the springs 103 urge the lever arms 26' in a direction to move the bread holders to non-toasting position as illustrated in Figure 9. Thus, the movement of the bread holders by the springs 103 is determined by the location of the pivot points 101 relative to the pivot points of the lever arms 26' or the axes of the rods 22'.

As in the preferred embodiment of the invention the slide 80 may be latched in its depressed position and the latch may be either manually or automatically released in the manner brought out. The springs 103 permit movement of the bread holders even when the slide 80 is latched in its depressed position to permit inspection of the bread slices being toasted and to permit the bread holders to adjust themselves to slices of different thicknesses. Thus, in both modifications the bread holders will readily adjust themselves to the thickness of the slices of bread and further will be capable of manual movement during the toasting operation to non-toasting position to permit inspection of the bread slices without affecting in any way the operation of the automatic release mechanism.

What we claim as our invention is:

1. In a toaster, a holder for supporting a bread slice in toasting position, said holder being movable to and from toasting position, a slidable member for moving said holder to toasting position, a latch engageable with said member for retaining said holder in toasting position, and a yieldable connection between said member and said holder for actuating the latter from the former while permitting said holder to adapt itself to the thickness of the bread slice.

2. In a toaster, a toast holder movable to and from toasting position, a slidable member for moving said toast holder, a latch engageable with said member for retaining said holder in toasting position, and a connection between said member and holder permitting manual movement of said holder to non-toasting position independent of said latch.

3. In an electric toaster, a heating element, a toast holder movable toward and away from said heating element, a vertically movable slide for moving said toast holder, means for depressing said slide to move said toast holder toward said heating element, means for latching said slide in its depressed position, and a yieldable connection between said toast holder and said slide whereby said toast holder may be moved away from said heating element while said slide is latched in its depressed position.

4. In an electric toaster, a heating element, a toast holder movable toward and away from said heating element, a vertically movable slide, a spring connecting said slide to said toast holder, said spring being operable upon downward movement of said slide to urge said toast holder toward said heating element, means constantly urging said slide upwardly, and a latch for retaining said slide in its depressed position.

5. In an electric toaster, a heating element, a toast holder movable toward and away from said heating element, a vertically movable slide, a spring connecting said slide to said toast holder, said spring being operable upon downward movement of said slide to urge said toast holder toward said heating element, means constantly urging said slide upwardly, means for manually moving said slide downwardly, a latch for retaining said slide in its depressed position, and mechanism operable automatically to release said latch.

6. In an electric toaster, a heating element, a pair of toast holders arranged on opposite sides of said heating element and movable toward and away from the same, a slide arranged between said toast holders for moving the same, a spring constantly urging said slide in one direction, means for latching said slide against movement by said spring, and means connecting said toast holders to said slide permitting movement of said toast holders independently of said slide.

7. In an electric toaster, a heating element, a pair of toast holders arranged on opposite sides of said heating element and movable toward and away from the same, a slide arranged between said toast holders for moving the same, a spring constantly urging said slide in one direction, means for latching said slide against movement by said spring, and means connecting said toast holders to said slide permitting movement of said toast holders independently of said slide, said last mentioned means including shafts mounting said toast holders, lever arms on said shafts, and springs connecting said lever arms to said slide.

8. In a toaster, a base, a frame on the base, a toast holder pivoted on the frame, a slide for moving said toast holder about its pivot to operative and inoperative positions, means associated with the base for holding the slide in a predetermined position, and an operating connection between the slide and holder permitting movement of the latter independently of the slide and causing the holder to automatically adapt itself to bread of different thicknesses.

9. In a toaster, a toast holder movable to and from operative position, a reciprocating member for moving said toast holder, and a yieldable connection between said reciprocating member and said toast holder for transmitting the movement of the former to the latter, maintaining the holder in operative position, automatically compensating for variation in thickness of bread slices and permitting movement of said toast holder independent of said member.

10. In an electric toaster, a heating element, a toast holder movable toward and away from said heating element, means for moving said toast holder, including a slidable member and a yieldable connection between said toast holder and said member, means for latching said member in position to retain said toast holder in toasting position, the connection aforesaid permitting movement of the holder while the member is latched, and means for releasing said latch.

11. In an electric toaster, a heating element, a toast holder movable to and from toasting position, means for moving said toast holder, including a slidable member and a resilient element connected to said toast holder and said member, a latch engageable with said member for retaining said holder in toasting position, and means for automatically releasing said latch.

12. In a toaster, a pivotally mounted toast holder, means including a slide for moving the holder to inoperative position, a resilient connection between the slide and holder operable to move the holder to operative position, a latching member engageable with the slide, and means engageable with the latching member to release the slide.

13. In a toaster, a pivotally mounted toast holder, a slide for moving the toast holder to operative and inoperative positions, a latching member engageable with the slide, and a resilient connection between the slide and holder causing the holder to remain in operative position but permitting manual movement of the holder independently of the slide while the slide is latched.

14. In a toaster, a pivoted toast holder, a reciprocating member, means operable to move the holder in one direction when said member is moved in one direction, and means including a yieldable element connected to said member and to said holder and operable when said member is moved in another direction to move the holder in another direction, the arrangement being such that the holder and element are movable independently of said member.

15. In a toaster, a toast holder, and actuating means for said holder including a reciprocating member, means for actuating said member, means operable by said member to move the holder to inoperative position, and yieldable means operable by said member to move the holder to operative position.

16. In a toaster, a pivoted toast holder, and actuating means for said holder including a reciprocating member, an arm projecting from said holder, a projection on the member engageable with the arm to move the holder in one direction, and a yieldable motion transmitted connection between said member and arm capable of moving the holder in another direction.

17. In a toaster, a pivoted toast holder, a reciprocating member, means operable when said member is moved in one direction to move the holder to inoperative position, and means including a yieldable element constituting a driving connection between said member and holder operable to move said holder to operative position when said member is moved in the opposite direction, the arrangement being such that said holder and element may be moved while the member is stationary.

FRANK KUHN.
LAURENCE H. THOMAS.